(12) United States Patent
Obata

(10) Patent No.: US 7,735,131 B2
(45) Date of Patent: Jun. 8, 2010

(54) ENDOSCOPE DEVICE FOR MEASURING AN OBJECT USING AN IMAGE, BY SETTING LOGIN QUALIFIERS ACCORDING TO EXAMINATION ENVIRONMENT

(75) Inventor: Mitsuo Obata, Hachioji (JP)

(73) Assignee: Olympus Corporation, Tokyo (JP)

( * ) Notice: Subject to any disclaimer, the term of this patent is extended or adjusted under 35 U.S.C. 154(b) by 1170 days.

(21) Appl. No.: 11/341,411

(22) Filed: Jan. 26, 2006

(65) Prior Publication Data
US 2006/0174133 A1      Aug. 3, 2006

(30) Foreign Application Priority Data
Jan. 28, 2005   (JP) .............................. 2005-021849

(51) Int. Cl.
*H04L 9/32* (2006.01)
*G06F 21/00* (2006.01)
*G06F 7/04* (2006.01)
*A61B 1/00* (2006.01)

(52) U.S. Cl. .............................. 726/19; 726/7; 600/101; 348/45

(58) Field of Classification Search ........................ None
See application file for complete search history.

(56) References Cited

U.S. PATENT DOCUMENTS

| | | | | |
|---|---|---|---|---|
| 6,602,185 | B1* | 8/2003 | Uchikubo | 600/118 |
| 7,252,633 | B2* | 8/2007 | Obata et al. | 600/118 |
| 7,358,987 | B2* | 4/2008 | Takeshige et al. | 348/74 |
| 2005/0166239 | A1* | 7/2005 | Uchikubo et al. | 725/78 |
| 2008/0295161 | A1* | 11/2008 | Uchikubo et al. | 726/7 |

FOREIGN PATENT DOCUMENTS

| | | |
|---|---|---|
| JP | 2002-34907 | 2/2002 |
| JP | 2004-135968 | 5/2004 |

* cited by examiner

*Primary Examiner*—Christopher A Revak
(74) *Attorney, Agent, or Firm*—Scully, Scott, Murphy & Presser, P.C.

(57) ABSTRACT

A CPU of a control unit has an authentication verification function which is an authentication verification unit which verifies a user name and password input from a remote control and a user name and password stored in SRAM, and a registration user setting function which is a login qualifier authorization unit for controlling editing of registration users as well as specifying a user for which login is authorized by a user setting function flag stored in the SRAM.

8 Claims, 20 Drawing Sheets

FIG.4

SRAM DATA

| CURRENT USER ID NO. | CURRENTLY SELECTED USER ID NO. (1-50)<br>DEFAULT: 1 |
|---|---|
| FIRST USER NAME | · IN CASE OF USER SETTING FUNCTION FLAG = 0<br>"ANY" SETTING (DEFAULT: ALL NULL)<br>· IN CASE OF USER SETTING FUNCTION FLAG = 1<br>FIRST USER NAME + NULL (DEFAULT: NULL) |
| FIRST PASSWORD | · IN CASE OF USER SETTING FUNCTION FLAG = 0<br>"ANY" SETTING (DEFAULT: ALL NULL)<br>· IN CASE OF USER SETTING FUNCTION FLAG = 1<br>FIRST PASSWORD + NULL (DEFAULT: NULL) |
| SECOND USER NAME | SECOND USER NAME + NULL (DEFAULT: NULL) |
| SECOND PASSWORD | SECOND PASSWORD + NULL (DEFAULT: NULL) |
| THIRD USER NAME | THIRD USER NAME + NULL (DEFAULT: NULL) |
| THIRD PASSWORD | THIRD PASSWORD + NULL (DEFAULT: NULL) |
| ⋮ | ⋮ |
| FORTY-EIGHTH USER NAME | FORTY-EIGHTH USER NAME + NULL (DEFAULT: NULL) |
| FORTY-EIGHTH PASSWORD | FORTY-EIGHTH PASSWORD + NULL (DEFAULT: NULL) |
| FORTY-NINTH USER NAME | FORTY-NINTH USER NAME + NULL (DEFAULT: NULL) |
| FORTY-NINTH PASSWORD | FORTY-NINTH PASSWORD + NULL (DEFAULT: NULL) |
| FIFTIETH USER NAME | FIFTIETH USER NAME + NULL (DEFAULT: NULL) |
| FIFTIETH PASSWORD | FIFTIETH PASSWORD + NULL (DEFAULT: NULL) |
| USER SETTING FUNCTION FLAG | 0: USER SETTING FUNCTION ON,<br>1: USER SETTING FUNCTION OFF<br>DEFAULT: 0 |

| FONT COLOR | BACKGROUND COLOR |
|---|---|
| WITH SHADOW | 0x00 |

BACKGROUND COLOR: 0x00

FONT COLOR: FIXED WITH SHADOW

200

| FONT COLOR | BACKGROUND COLOR |
|---|---|
| 0x00 | 0xFF |

BACKGROUND COLOR: 0xFF

FONT COLOR: 0x00

201

ENDOSCOPE DEVICE FOR MEASURING AN OBJECT USING AN IMAGE, BY SETTING LOGIN QUALIFIERS ACCORDING TO EXAMINATION ENVIRONMENT

This application claims benefit of Japanese Application No. 2005-21849 filed in Japan on Jan. 28, 2005 the contents of which are incorporated by this reference.

BACKGROUND OF THE INVENTION

1. Field of the Invention

The present invention relates to an endoscope device which measures an object using an image.

2. Description of the Related Art

An endoscope image recording device which creates a code for detecting tampering with a recorded image data file, and provides a managing unit which associates and manages the image data file and the tampering detecting code, is proposed in Japanese Unexamined Patent Application Publication No. 2002-34907.

Also, Japanese Unexamined Patent Application Publication No. 2004-135968 proposes an endoscope control system which exclusively controls the network connection of a control unit and an external terminal with an ID and password, the endoscope control system having the control unit which has a server connected to the endoscope device and performing network communication, and an external terminal which can be connected to a network and having a function for remotely operating an endoscope device.

SUMMARY OF THE INVENTION

The endoscope device according to the present invention comprises:
an endoscope for capturing the image of an object;
a signal processing unit for signal processing of an image-capturing signal from the endoscope and for measurement of the object based on an endoscope image;
the signal processing unit having
an authentication information input unit for inputting authentication information,
a login information storage unit for storing authentication confirmation information for verifying the authentication information and login mode information that specifies a login qualifier at the time of system login with multiple modes,
an authentication verification unit for verifying the authentication information and the authentication confirmation information, and
a login qualifier authorization unit for authorizing system login for a login qualifier based on verification results of the authentication verification unit when the login mode information is a first login mode information, and for at least an arbitrary login qualifier when the login mode information is a second login mode information.

Other features and advantages of the present invention will become apparent from the following description.

BRIEF DESCRIPTION OF THE DRAWINGS

FIGS. 1 through 21 relate to a first embodiment of the present invention.

FIG. 1 is a configuration diagram illustrating the configuration of an endoscope device for performing measurement;

FIG. 2 is a block diagram illustrating the configuration of a video signal processing circuit in FIG. 1;

FIG. 3 is a block diagram illustrating the configuration of an audio signal processing circuit shown in FIG. 1;

FIG. 4 is a diagram illustrating SRAM memory map shown in FIG. 1;

FIG. 5 is a flowchart illustrating the flow of setting processing with a control unit by a PC shown in FIG. 1;

FIG. 6 is a diagram illustrating a user information setting screen opened on the PC in the processing shown in FIG. 5;

FIG. 7 is a flowchart illustrating the flow of user authentication processing with a control unit shown in FIG. 1;

FIG. 8 is a diagram illustrating a user selection image opened on the LCD with first mode authentication processing shown in FIG. 7;

FIG. 9 is a flowchart illustrating the flow of the first mode authentication processing in FIG. 7;

FIG. 10 is a diagram illustrating a login window opened with the user login processing in FIG. 9;

FIG. 11 is a flowchart illustrating the flow of the user login processing in FIG. 9;

FIG. 12 is a diagram illustrating the user selection image opened on the LCD with a second mode authentication processing in FIG. 7;

FIG. 13 is flowchart illustrating the flow of the second mode authentication processing in FIG. 7;

FIG. 14 is a diagram illustrating a new user registration window opened with a new user registration processing in FIG. 13;

FIG. 15 is a flowchart illustrating the flow of the new user registration processing in FIG. 13;

FIG. 16 is a diagram illustrating the user selection window opened with the user selection processing in FIG. 13;

FIG. 17 is a flowchart illustrating the flow of the user selection processing in FIG. 13;

FIG. 18 is a first diagram describing an example of a function released only to registered users authenticated with the second mode system operation;

FIG. 19 is a second diagram describing an example of a function released only to registered users authenticated with the second mode system operation;

FIG. 20 is a third diagram describing an example of a function released only to registered users authenticated with the second mode system operation;

FIG. 21 is a fourth diagram describing an example of a function released only to registered users authenticated with the second mode system operation;

DESCRIPTION OF THE PREFERRED EMBODIMENTS

Figure 1:
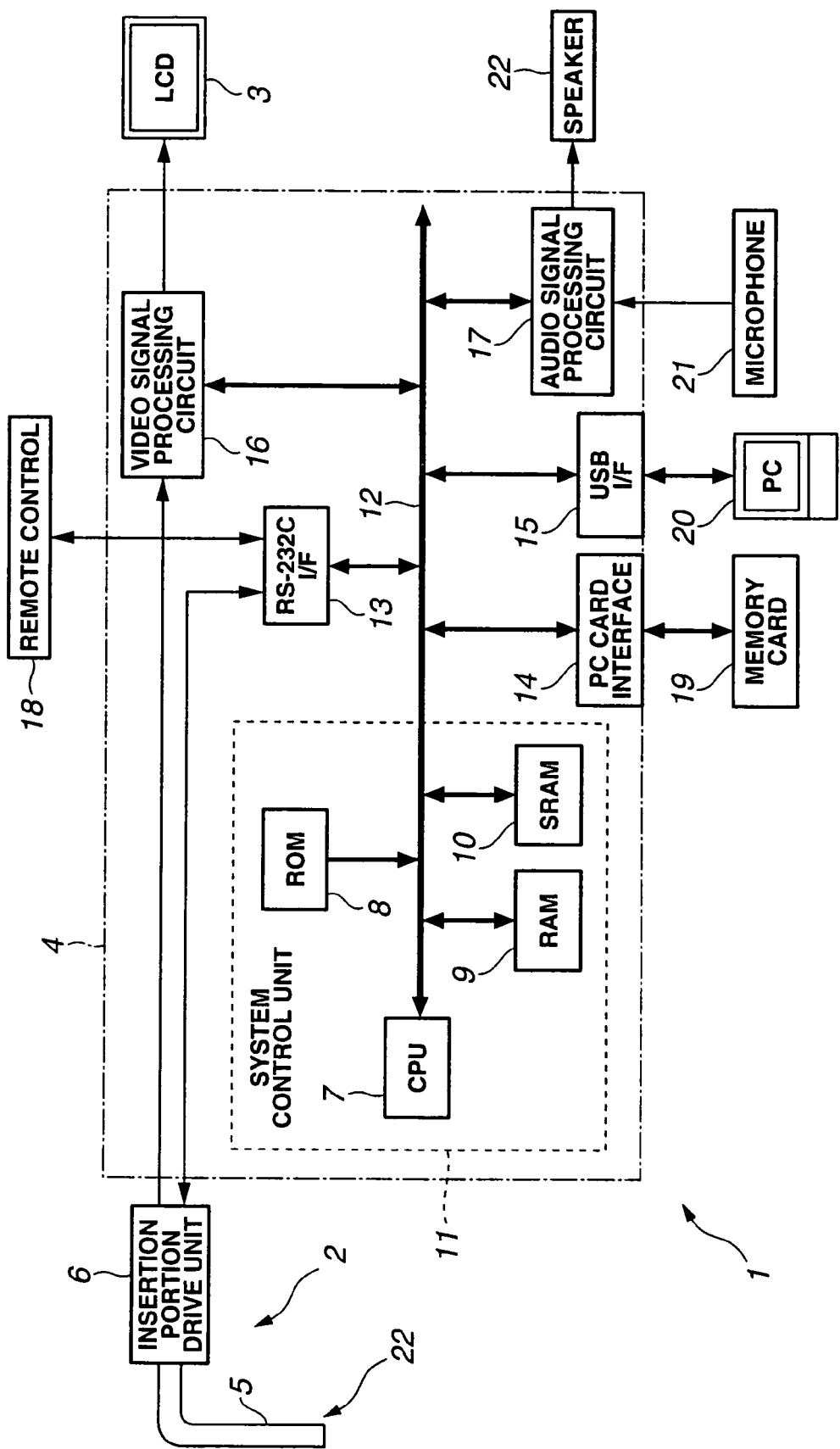

A measuring endoscope device 1 of a first embodiment of the present invention as illustrated in FIG. 1 primarily comprises an endoscope 2, a liquid crystal monitor (hereafter called "LCD") 3, a control unit 4, and a remote controller 18 which is an authentication information inputting unit.

The endoscope 2 has a flexible insertion portion 5 which is slender in shape, and is connected to a control unit 4 via a lighting device which supplies necessary illumination for observation (not shown), a camera control unit which performs processing for generating a video signal from the image-capturing signal from the CCD, for example, which is provided on the distal end of the insertion portion (not shown), and an insertion portion drive unit 6 which provides a bending device (not shown) which bends a bendable portion 22 comprising the abovementioned insertion portion 5.

Within the control unit 4, an audio signal processing circuit 17, a video signal processing circuit 16 to which is input the abovementioned video signal, a PC card interface (hereafter called "PC card I/F") 14, a USB interface (hereafter called "USB I/F") 15, and a RS-232C interface (hereafter called "RS-232C I/F") 13, and a system control unit 11 which executes these various functions based on a main program so as to effect control, are each connected via a system bus 12.

This system control unit 11 has a CPU 7 which performs system control, a ROM 8 which stores the operation program and the like of this CPU 7, a RAM 9 as a memory used for a work area of the CPU 7 or used for storage of necessary data, and a SRAM 10 which is a login information storage unit which stores user information to be described later; each connected to the system bus 12.

The SRAM 10 is backed up with a battery or the like, not shown, and can maintain user information even when the power is turned off from the control unit 4.

The abovementioned RS-232C I/F 13 is connected to the abovementioned insertion portion drive unit 6 and to the abovementioned remote control 18 which gives operation instructions and performs control of the insertion portion drive unit 6 and so forth. Thus, communication necessary for controlling operation of the insertion portion drive unit 6 is performed based on the operations of the remote control 18.

The USB I/F 15 is an interface for electrically connecting the abovementioned control unit 4 and the personal computer (hereafter called "PC") 20. By connecting the abovementioned control unit 4 and the PC 20 via the USB I/F 15, various types of instruction control can be performed on the PC side such as display instructions of the endoscope image, or image processing when measuring, and also necessary control information for various processing between the control unit 4 and the PC 20, or data input/output can also be performed.

Also, the abovementioned PC card I/F 14 can have a detachable so-called memory card, which is a recording medium such as a PCMCIA memory card 19 or a compact flash (registered trademark) memory card (not shown) or the like.

Importing of data such as control processing information or image information that is stored in the memory card 19, or recording of data such as control processing information or image information into the memory card 19, can also be performed under control by the CPU 7, by mounting the memory card 19 to the PC card I/F 14.

With the video signal processing circuit 16, synthesizing processing of the video signal from the insertion portion drive unit 6 and the display signal based on the operating image generated by the control by the CPU 7, or necessary processing for displaying on the screen of the abovementioned LCD 3 is performed and supplied to the LCD 3, so as to display a synthesized image of an endoscope image (video signal) supplied from the abovementioned insertion portion drive unit 6 and an operating image generated by the graphic processing.

Also, with the video signal processing circuit 16, processing can be performed for simply displaying an endoscope image or displaying an operating screen image or the like, independently. Therefore, on the LCD 3 screen, an endoscope image, an operating menu image, or a synthesized image such as that of an endoscope image and an operating menu image, can be displayed.

(1) An audio signal which is generated by collecting sound by the microphone 21 and recorded onto a recording medium such as a memory card 19, (2) an audio signal obtained by playing back the recording medium such as the memory card 19, or (3) an audio signal generated and processed by the CPU 7, is supplied to the abovementioned audio signal processing circuit 17. With this audio signal processing circuit 17, the supplied audio signal (1) through (3) is processed using necessary amplification processing or the like for playback, and is output to the speaker 22. Thus, the sound is output from the speaker 22.

Figure 2:
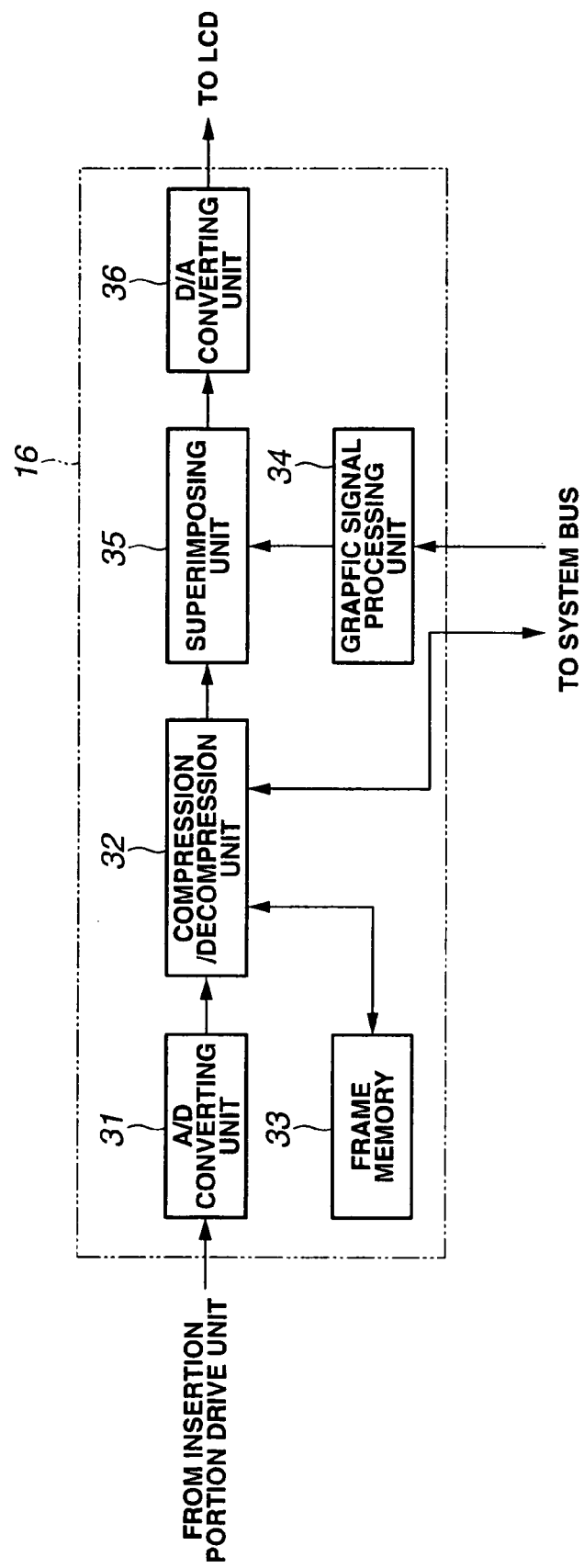

The video signal processing circuit 16 comprises an A/D converting unit 31 for converting a video signal supplied from the abovementioned insertion unit drive unit 6 to a digital signal, a compression/decompression unit 32 which performs compression and decompression processing as to the endoscope image data output from the A/D converting unit 31, a frame memory 33 which stores the endoscope image data with the compression/decompression unit 32, a graphic signal processing unit 34 for generating graphic image data such as an operating menu and the like by the control of the CPU 7 via a system bus 12, a superimposing unit 35 for generating the synthesized image data by superimposing the graphic image data generated with the graphic signal processing unit 34 onto the endoscope image data from the compression/decompression unit 32, and a D/A converting unit 36 for converting the synthesized image data from the superimposing unit 35 to an analog signal, and displaying the synthesized image on the LCD 3, as illustrated in FIG. 2.

Figure 3:
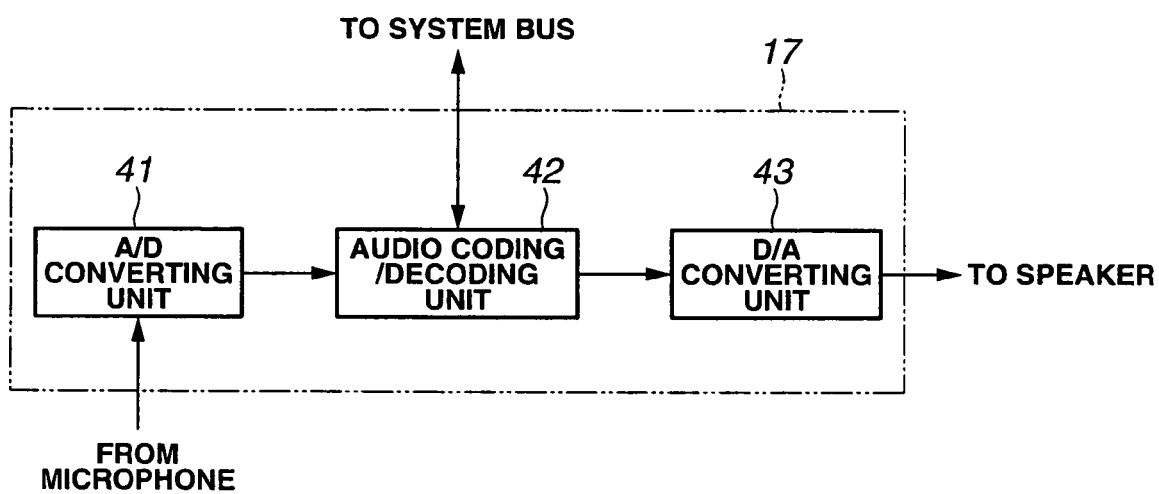

The audio signal processing circuit 17 comprises an A/D converting unit 41 for converting an audio signal collected by the microphone 21 to a digital signal, an audio encoding/decoding unit 42 for encoding and decoding the audio data from the A/D converting unit 41 and for performing data sending and receiving with the memory card 19 for example, via the system bus 12, and a D/A converting unit 43 for converting the audio data decoded with the audio encoding/decoding unit 42 to an analog signal and outputting this to the speaker 22, as illustrated in FIG. 3.

The operations of the present embodiment thus comprised will be described.

User information formed of various parameters and flags as illustrated in FIG. 4 are stored in the SRAM 10 of the system control unit 11. Specifically, the user information stored in the SRAM 10 is a user ID No. selected according to the user currently logged in to the control unit 4 and for example allocated for every fifty users, and a user name for each user (first user name through fiftieth user name) as authentication confirmation information at time of system login for performing authentication of login to the control unit 4, and a password (first password name through fiftieth password name), and user setting function flags as login mode information at time of system login which specifies the user registration authorized/not authorized and so forth with the control unit 4.

Figure 5:
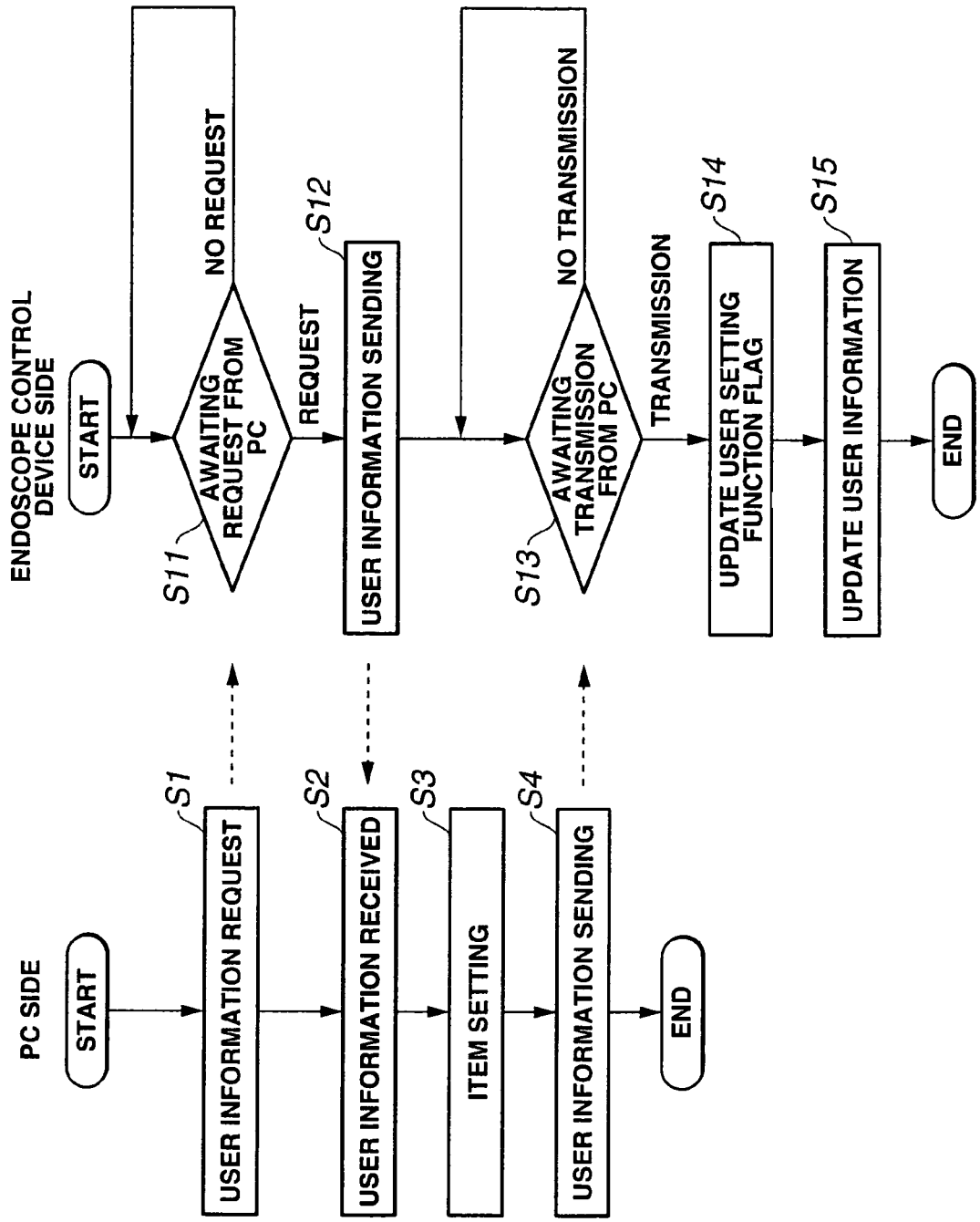

When the control unit 4 and the PC 20 are connected, as illustrated in FIG. 5, on the PC 20 side, the user information (reference FIG. 4) stored in the SRAM 10 is requested to the control unit 4 in Step S1. Then, when the user information is received from the control unit 4 in Step S2, various item settings of user information such as user ID No., user name, password and the like is performed in Step S3, and the user information for the item settings is sent to the control unit 4 in Step S4, and the processing is ended.

Thus, with the PC 20, the user information stored in the SRAM 10 of the control unit 4 can be edited or newly added.

Figure 6:
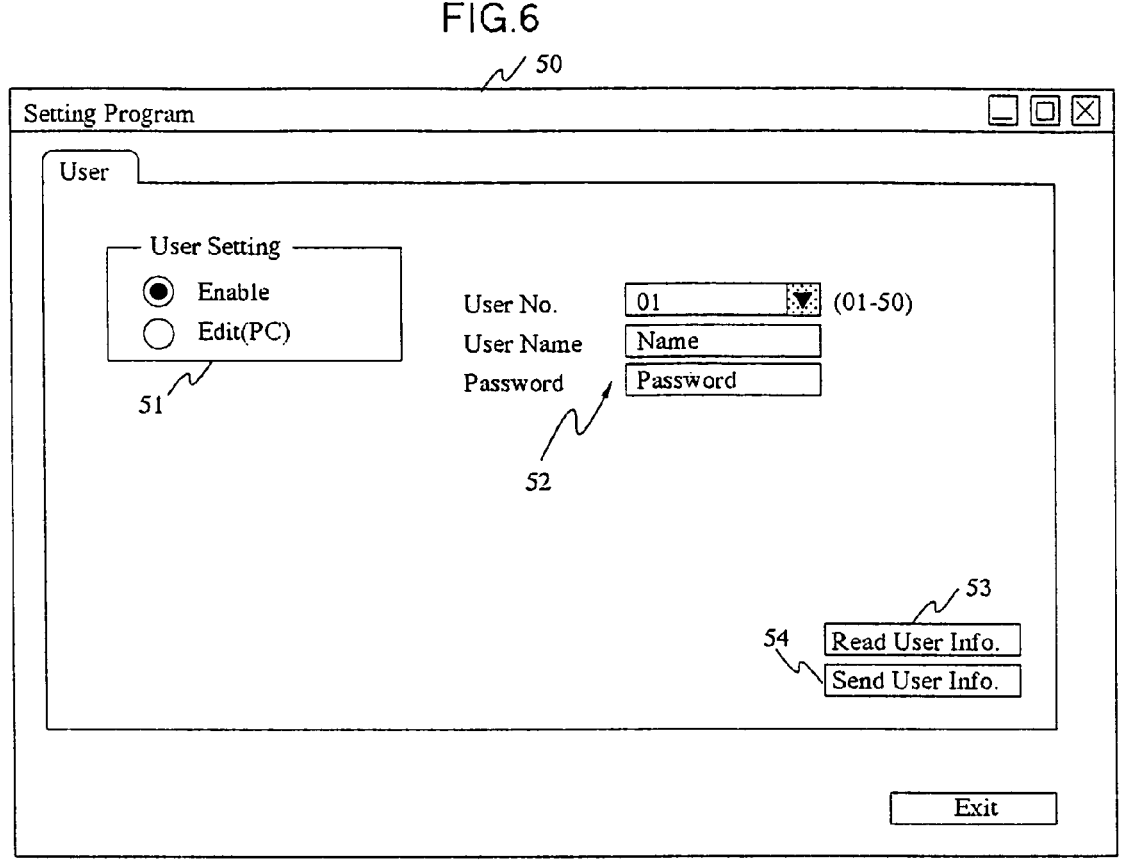

Specifically, when the control unit 4 and the PC 20 are connected, the user information setting screen 50 is displayed on the monitor of the PC 20, as illustrated in FIG. 6. This user information setting screen 50 has a user editorial rights setting area 51 for setting user editorial rights (login mode information) wherein user settings can be edited, an item setting area 52 for performing item setting, a user information request button 53 for performing a user information request as to the control unit 4, and a user information sending button 54 for executing sending of user information to the control unit 4.

In the user editorial rights setting area 51, only one button can be selected from the radio buttons "Edit (PC)" and "Enable".

When the "Edit (PC)" radio button in the user editorial rights setting area 51 is selected, the user editorial rights are set to the PC 20, and editing of the user settings (data updates, new registration of a user, or deleting a user) can only be performed on the PC 20. At this time the control unit 4 uses the system operation of the first mode to be described later.

Also, when the "Enable" radio button in the user editorial rights setting area 51 is selected, the user editorial rights are set to the control unit 4, and editing of the user settings (data updates, new registration of a user, or deleting a user) can be performed on the control unit 4. At this time the control unit 4 uses the system operation of the second mode to be described later.

The PC 20 reflects the user editorial rights in the user setting function flags in Step S3 and sends this to the control unit 4. When the user editorial rights are at the control unit 4, the user setting function flag=0, and when the user editorial rights are at the PC 20, the user setting function flag=1.

Now, when the user editorial rights are set in the control unit 4, the control unit 4 is not only able to edit the user settings (data updates, new registration of a user, or deleting a user), but system login can be authorized for a user not registered (that is to say, settings not performed for a user name and a password), in a state wherein specified functions are limited for the user.

Returning to FIG. 5, when the control unit 4 and the PC 20 are connected, the control unit 4 side awaits a request for user information from the PC 20 in Step S11, and when there is a request for user information from the PC 20, the user information is read out from the SRAM 10 and sent to the PC 20 in Step S12.

Then, in Step S13, reception of the updated user information by the PC 20 in Step S14 is awaited, and when the user information is received, the user setting function flag, which shows the user editorial rights set in the PC 20, is updated and stored in the SRAM 10. Subsequently, user information excluding the user setting function flag, that is to say the current user ID No., user name, and password (reference FIG. 4), is updated in Step S15 and stored in the SRAM 10, and the processing is ended.

When user settings are thus performed by the PC 20, the control unit 4 becomes independent from the PC 20, and examination is executed with the control unit 4 alone.

Although not shown in the drawings, the CPU 7 of the control unit 4 has an authentication verification function which is an authentication verification unit for verifying (1) the user name and password input from the remote control 18 and (2) the user name and password stored in the SRAM 10. Further, the CPU 7 has a registration user setting function which is a login qualifier authorization unit for specifying users authorized to login with the user setting function flag stored in the SRAM 10, as well as for controlling the editing of registered users.

Figure 7:
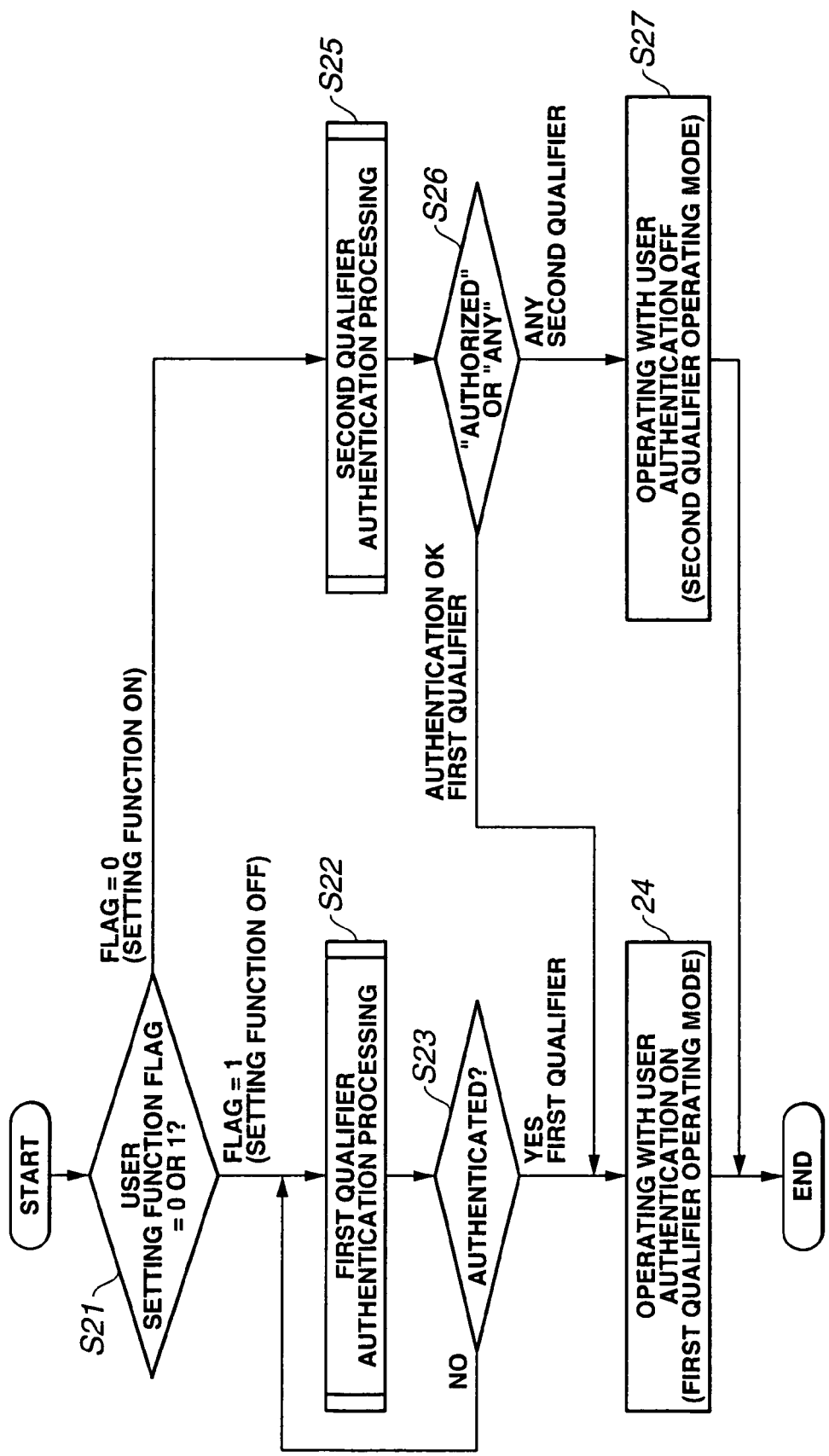

When examination begins, the control unit 4 confirms the user setting function flag showing the user editorial rights stored in the SRAM 10 in Step S21, as illustrated in FIG. 7. In the event that the user setting function flag=1 and the user setting function of the control unit 4 is OFF (in the case that the user editorial rights is in the PC 20: the first login mode), the operating image is displayed in the LCD 3 in Step S22 and the first qualifier authentication processing to be described later is executed. Next, whether or not the authentication result from the first qualifier authentication processing is "authorized" is determined in Step S23. In the event this is "authorized", the system is operated in the first qualifier operation mode wherein the function level in the control unit 4 goes to user authentication ON level in Step S24, and the processing is ended. In the event this is not "authorized", the flow returns to Step S22. Here, the first qualifier specifies the registered user.

In the event that the user setting function flag=0 and the user setting function of the control unit 4 is on (in the case that the user editorial rights is in the control unit 4: the second login mode), the operating image is displayed in the LCD 3 in Step S25 and the second qualifier authentication processing to be described later is executed. Determination is made regarding whether the authentication result from the second qualifier authentication processing is "authorized" (including newly registered) or ANY (arbitrary user login authorized) in Step S26. In the event this is "authorized", the flow proceeds to Step S24, and in the event this is "ANY", the system is operated in the second qualifier operation mode wherein the function level in the control unit 4 goes to user authentication OFF level in Step S27, and the processing is ended. Here, the second qualifier specifies the arbitrary user.

In the first qualifier authentication processing in Step S22, authentication is performed on the control unit 4 only in the event that the device user is the registered user (first qualifier), and registering a new user or deleting a user is performed in advance, connected to the PC 20 (only the system administrator can perform this).

With the second qualifier authentication processing in Step S25, authentication of an arbitrary user (second qualifier), selection and authentication of a registered user, registration of a new user, and deleting of a user is performed in the control unit 4.

Now, in the event of a previously registered user, user authentication is performed at time of system startup. However, the system can be started with arbitrary user settings. Also, the user setting function (user name, password change function and so forth) can be selected from a menu.

The first qualifier operation mode with the user authentication ON level in Step S24 is an operating mode wherein the device user of the measuring endoscope device 1 is strictly authenticated, and is an operating mode which does not authorize login of an arbitrary user other than a registered user (include newly registered users: first qualifier), and the operations using all of the functions that the control unit 4 has can be performed.

In other words, the first qualifier operation mode is an operation mode wherein the device user of the measuring endoscope device 1 is limited to registered users, regardless of the settings (login mode) of the user setting function flag (regardless of whether the user editorial rights are in the PC 20 or in the control unit 4). In the event that the user editorial rights are in the control unit 4 (second login mode), the newly registered users that are newly registered in the control unit 4 with the second qualifier authentication processing also are set as registered users (first qualifier) and use of the measuring endoscope device 1 is authorized.

Also, with the system operation in the second qualifier operation mode with the user authentication OFF level in Step S27, login of an arbitrary user by the second qualifier authentication processing is authorized. However, for arbitrary users, operation is in a state wherein specified functions are limited. With the second qualifier operating mode, the device itself can be used even without user authentication, but for example the processing of an image recorded on the device differs from the first qualifier operating mode, and while registered user information is added to the image data and managed in first qualifier operating mode, the user information is not added in second qualifier operating mode and only the image data is recorded.

Now, at the time of system operation startup and examination, a live image from the endoscope 2 is displayed on the LCD 3.

Next, the first qualifier authentication processing in Step S22 will be described.

Figure 8:
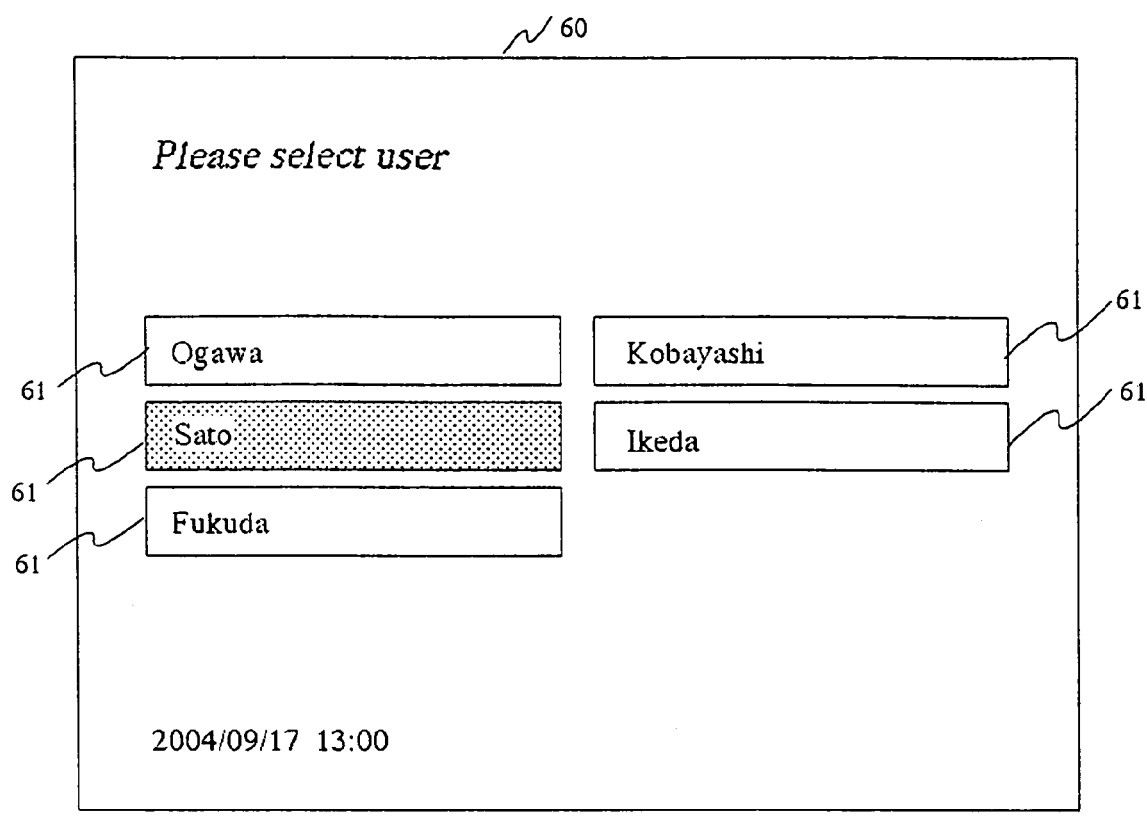

Upon transition of the control unit 4 to the first qualifier authentication processing while the user setting function flag=1 (first login mode), a user selection image 60, which is one of the operating images generated by the control of the CPU 7 as illustrated in FIG. 8, is displayed on the LCD 3. The user selection image 60 has multiple user icons 61 corresponding to the user names registered (stored) in the SRAM 10, and the first qualifier authentication processing is executed by the user selection image 60.

Figure 9:
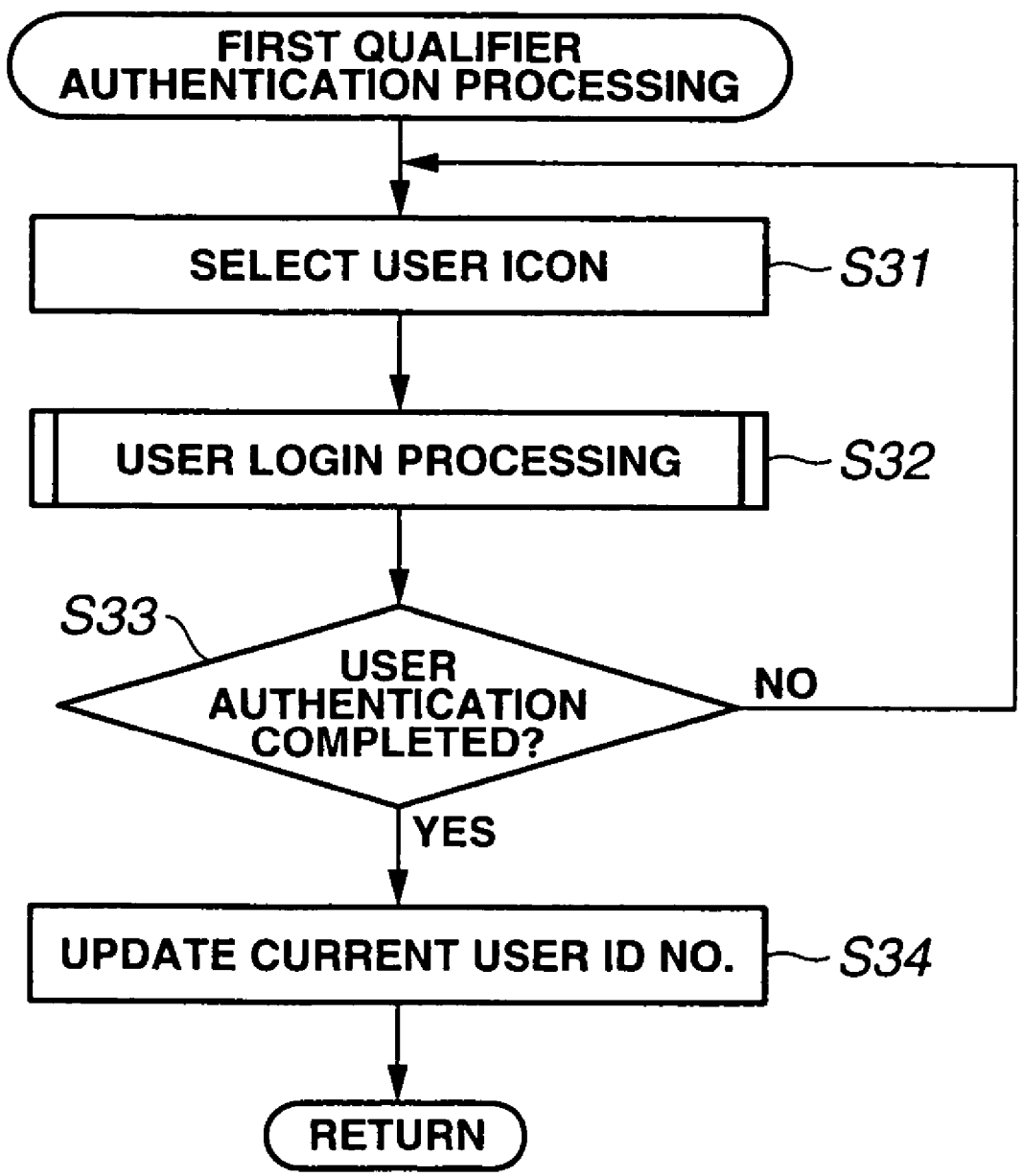

With the first qualifier authentication processing, by the user desiring to login using remote control 18 selecting his own user icon 61, the desired user icon 61 is selected from multiple user icons 61 in Step S31, as illustrated in FIG. 9. FIG. 8 illustrates a situation wherein the user icon 61 with the user name "Sato" is selected, and the selected user icon 61 is displayed highlighted.

Upon the desired user icon 61 being selected, the user login processing to be described later is executed in Step S32. Then in Step S33, determination is made, from the state of the user authentication completion flag within the RAM 9, as to whether user authentication has been completed in the user login processing, and if the user authentication is completed (user authentication completion flag=1), in Step S34 the current user ID No. is updated to an authenticated user ID No., and the process is ended.

Figure 10:
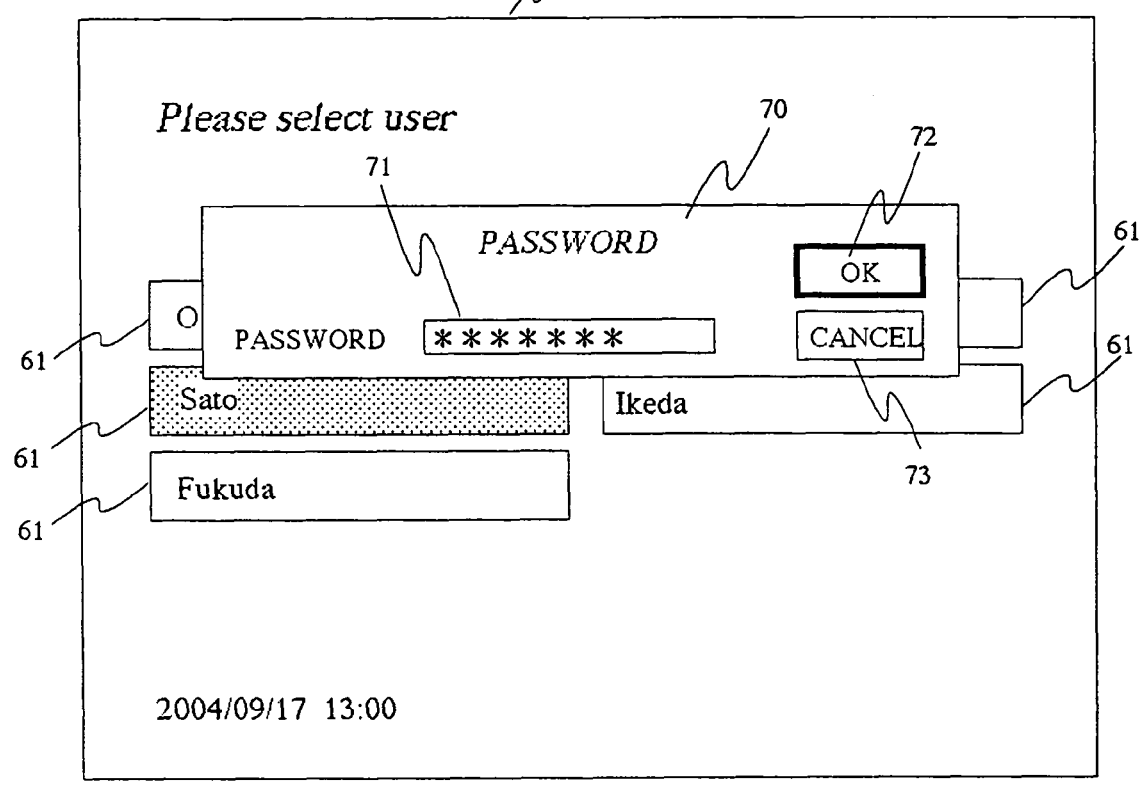

Transition to the user login processing in Step S33, as illustrated in FIG. 10, opens a login window 70 over the user selection image 60. The login window 70 has a password input area 71 for inputting a password, and an OK button 72 for instructing input completion of the password, and a cancel button 73 for stopping password input.

Figure 11:
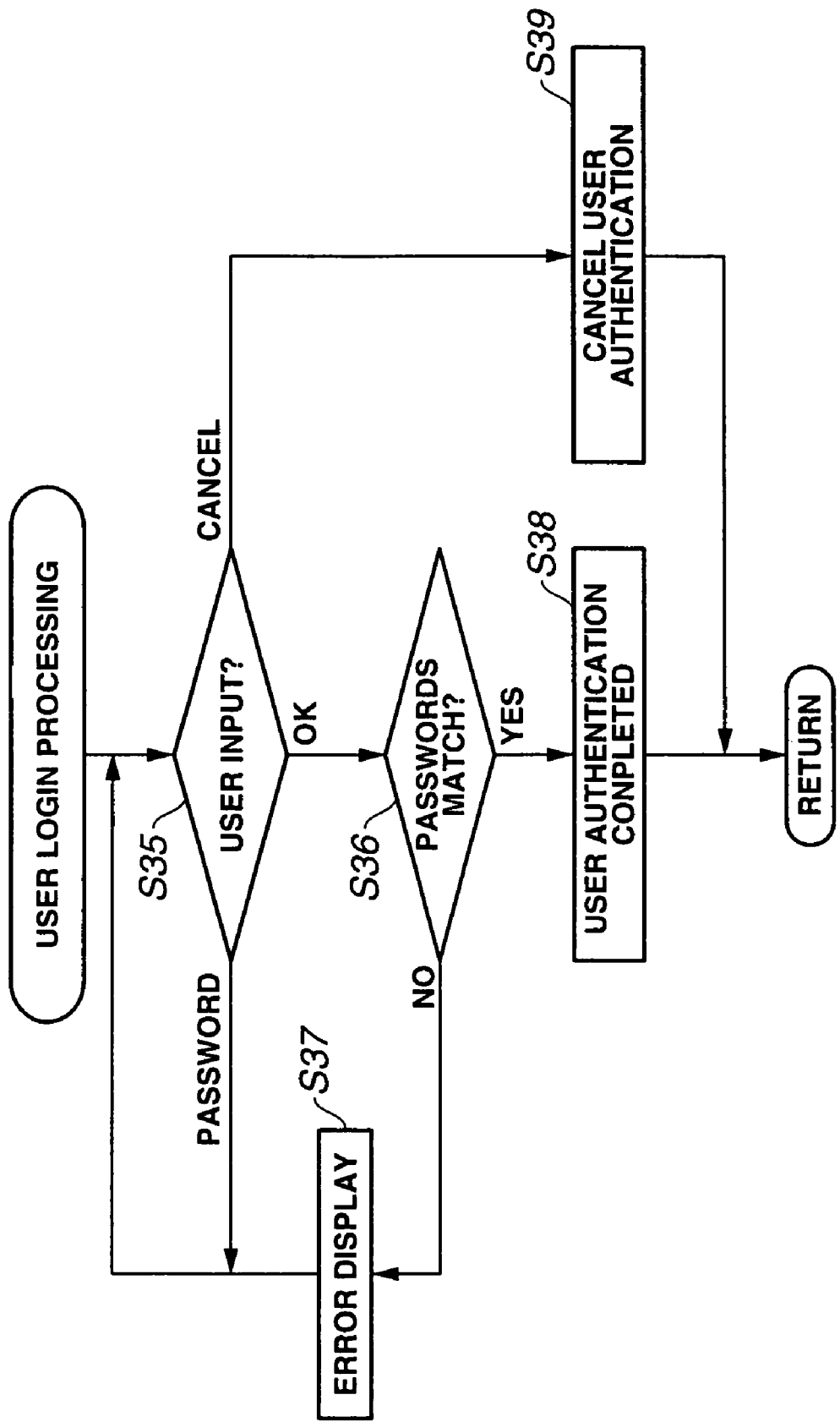

With the user login processing, the user can determine from this login window 70, as illustrated in FIG. 11, what has been input in the login window 70 using the remote control 18 in Step S35, and in the event that the OK button 72 has been selected the flow proceeds to Step S36, and in the event that the cancel button 73 has been selected the flow proceeds to Step S39, and in the event that a password is input, selection of the OK button 72 or the cancel button 73 is awaited.

In Step S36, determination is made as to whether the password input in the password input area 71 matches the password of the user name of the login qualifier registered (stored) on the SRAM 10. In the event there is no match, for example in Step S37 an error display is performed such as "password does not match" and the flow returns to S35, and in the event the passwords match, the user authentication completion flag within the RAM 9 is set to 1 as user authentication completion in Step S38, and the processing is ended.

Also, in Step S39, the user authentication completion flag within the RAM 9 is set to 0 to indicate user authentication cancellation, and the processing is ended.

Next, the second qualifier authentication processing in Step S25 will be described.

Figure 12:
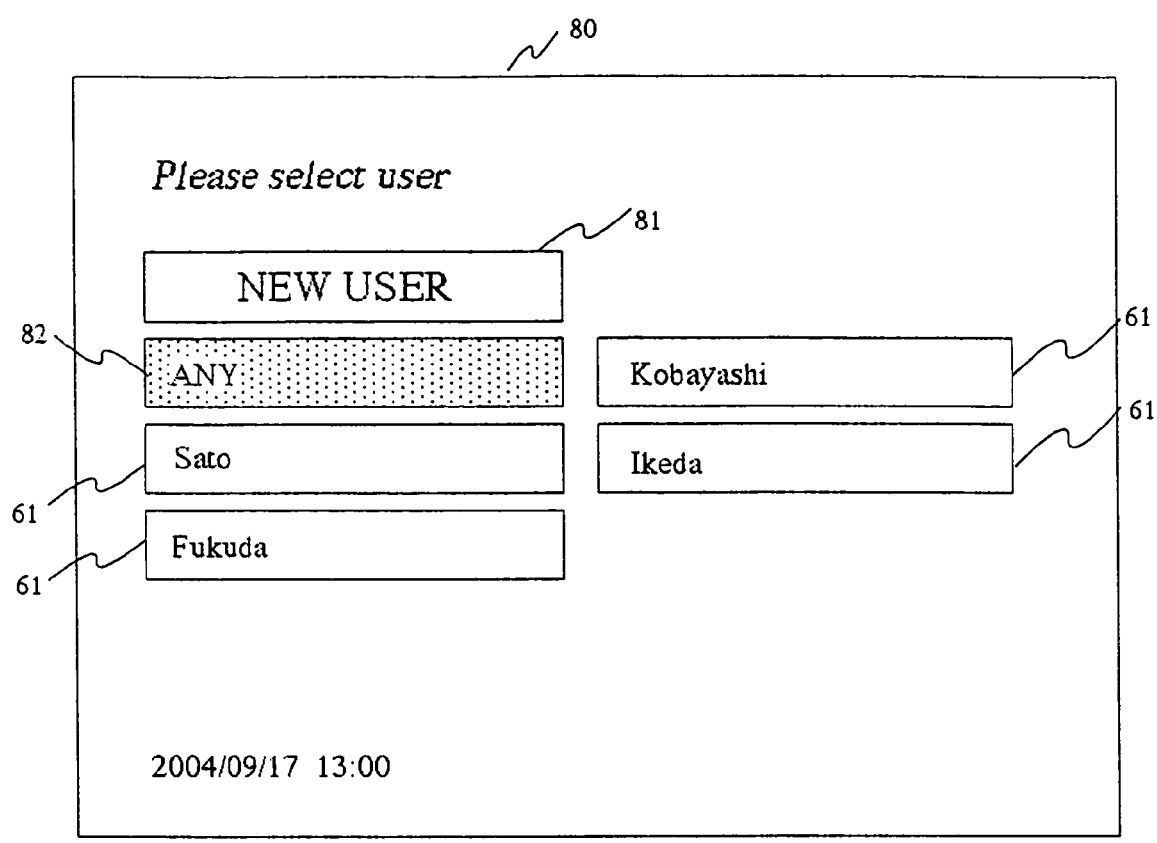

Upon transition of the control unit 4 to the second qualifier authentication processing with the user setting function flag=0 (the second login mode), a user selection image 80, which is one of an operating image generated by the control of the CPU 7 such as that illustrated in FIG. 12, is displayed on the LCD 3. The user selection image 80 has a new user icon 81 for executing new user registration, an ANY icon 82 for authorizing login for an arbitrary user, and multiple user icons 61 corresponding to the user names registered (stored) on the SRAM 10, and the second qualifier authentication processing is executed by the user selection image 80.

Figure 13:
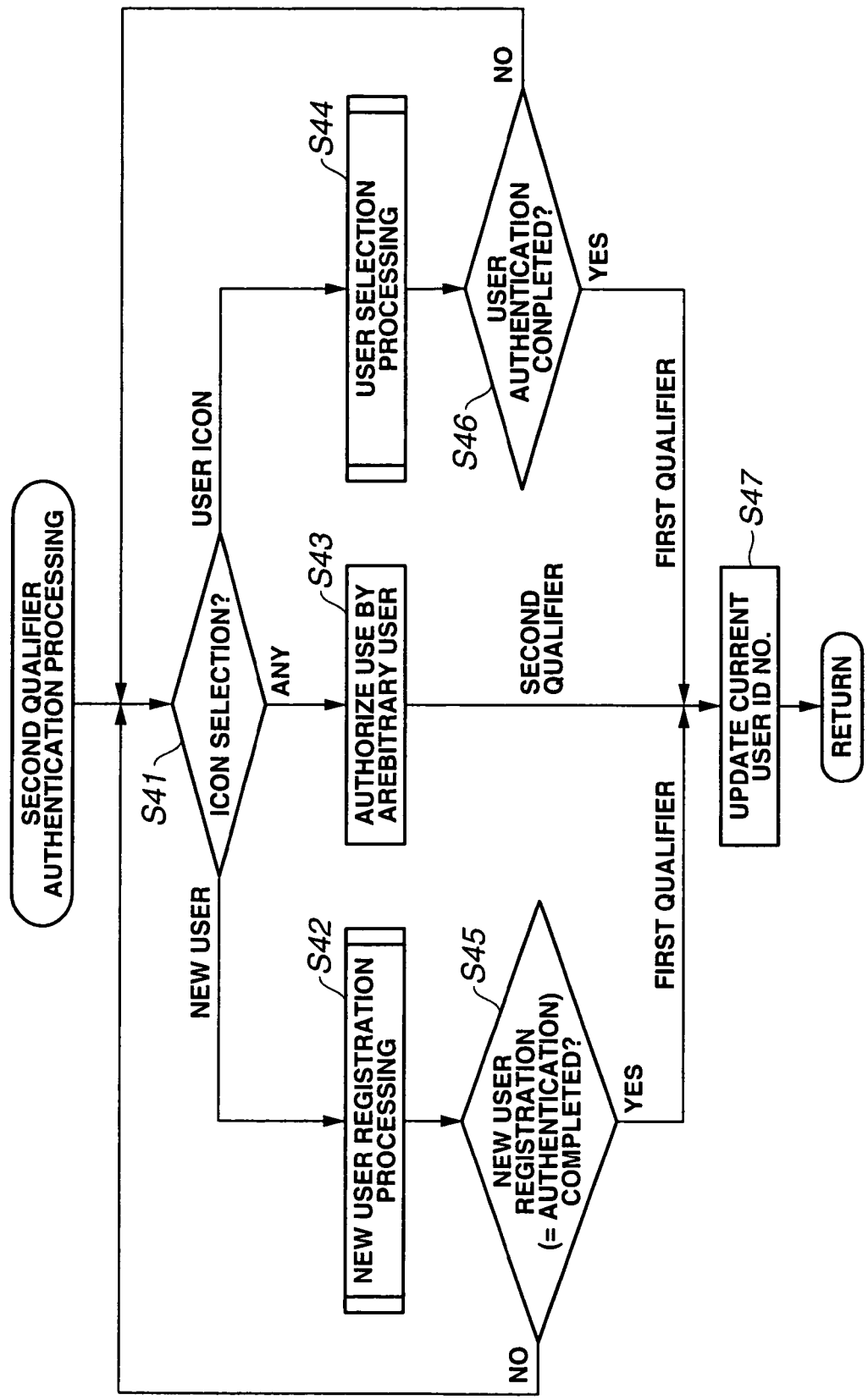

With the second qualifier authentication processing, first, as illustrated in FIG. 13, determination is made as to which of the new user icon 81, the ANY icon 82, or the user icon 61 for a user selection request (login request or registration deleting request) is selected by the operation of the remote control 18 in Step S41.

Then, in the event that the new user icon 81 is selected, new user registration processing which will be described later is executed in Step S42, and in the event that the ANY icon 82 is selected, an arbitrary user login (use) is authorized in Step S43, and further, in the event that the user icon 61 for a user selection request is selected, user selection processing which will be described later is executed in Step S44.

In the event that the new user registration processing in Step S42 is ended, determination is made in Step S45 as to whether new user registration has been completed according to the status of the user authentication completion flag in the RAM 9. In the event that the new user registration is completed (user authentication completion flag=1), the current user ID No. is updated to the user ID No. of a newly registered user in Step S47, and the processing is ended.

Also, after arbitrary user login (use) is authorized in Step S43, the current user ID No. is updated to ANY in Step S47, and the process is ended.

Further, in the event that the user selection processing in Step S44 is ended, determination is made in Step S46 as to whether user authentication is completed with the user selection processing according to the status of the user authentication completion flag in the RAM 9. In the event that the user authentication is completed (user authentication completion flag=1), the current user ID No. is updated to the user ID No. of an authenticated user in Step S47, and the processing is ended.

Figure 14:
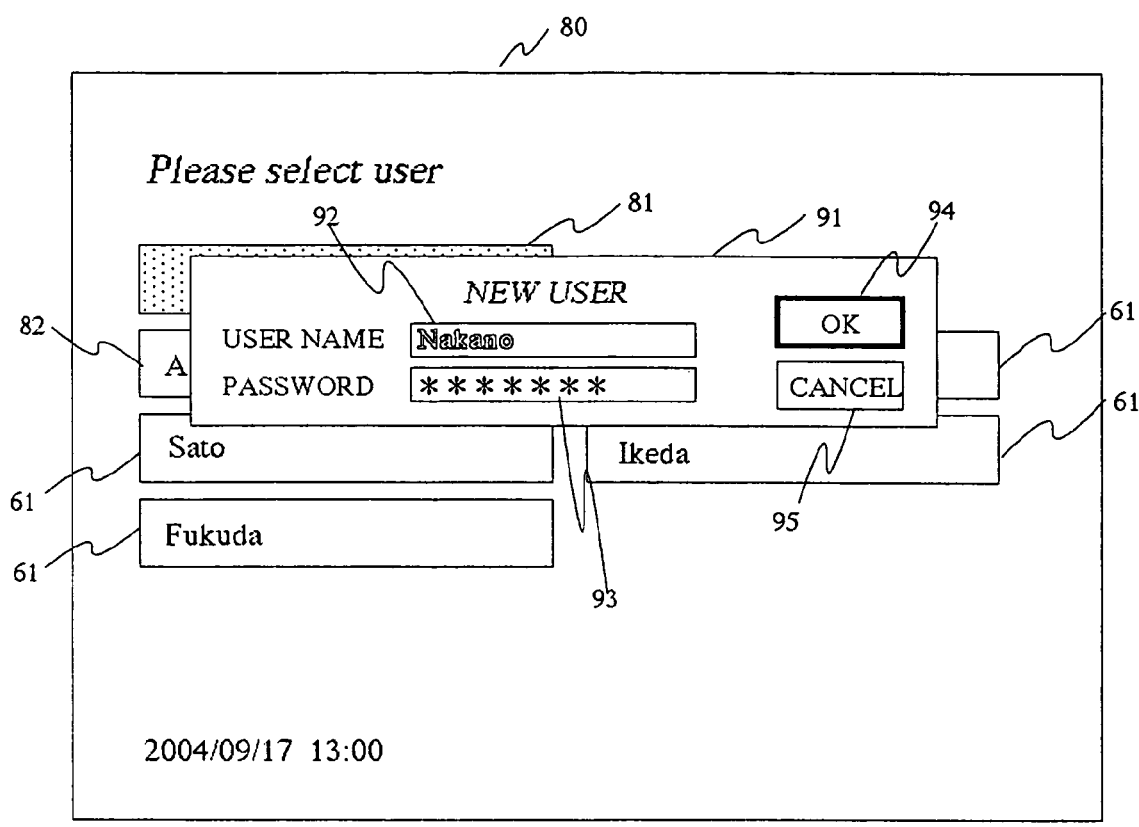

In the event of transition to the new user registration processing in Step S42, as illustrated in FIG. 14, a new user registration window 91 is opened on the user selection image 80. The new user registration window 91 has a user name input area 92 for inputting a user name to be newly registered, a password input area 93 for inputting a password to be registered, an OK button 94 for instructing input completion of the user name and password, and a cancel button 95 for stopping user name and password input.

Figure 15:
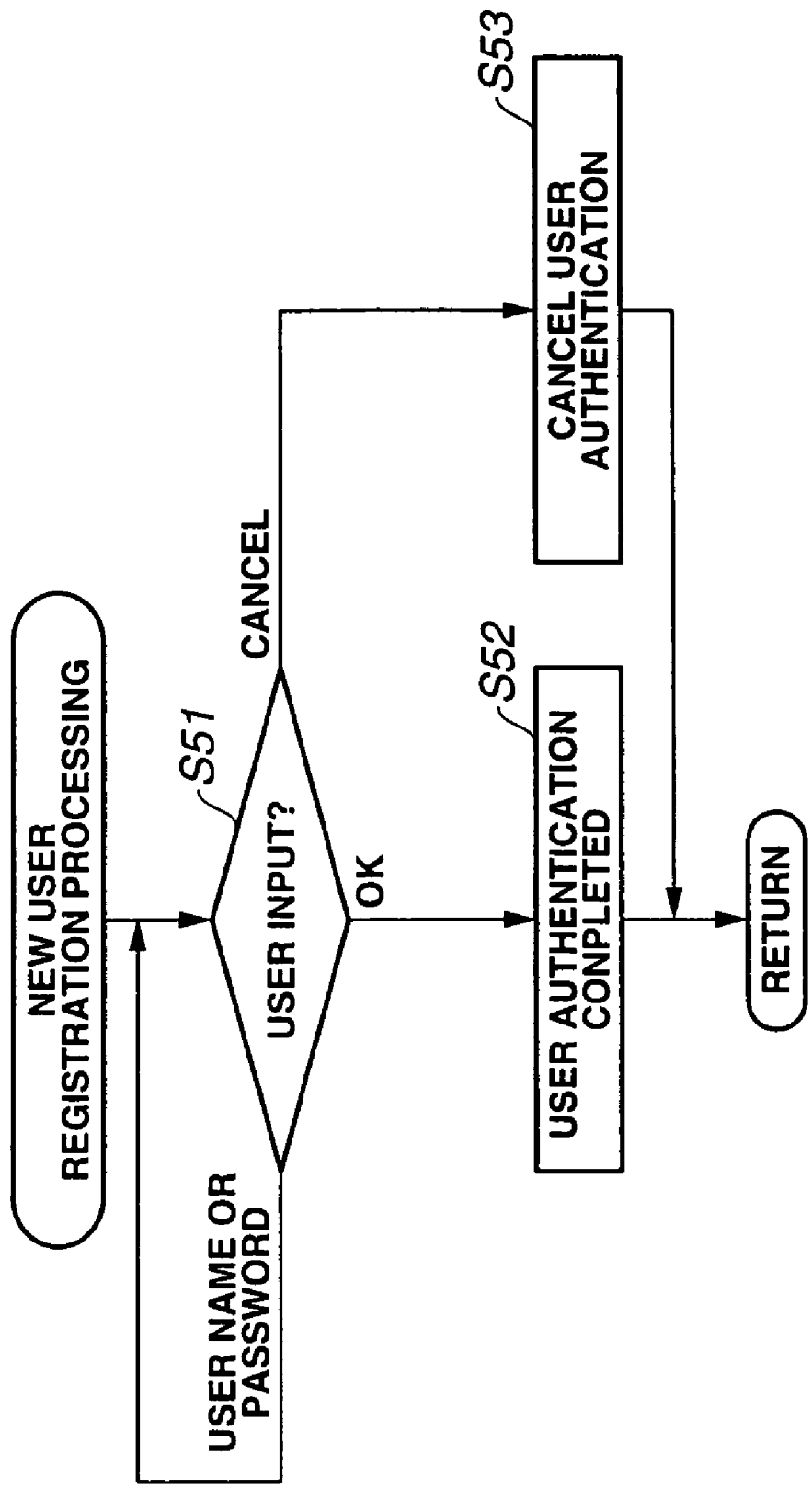

The new user registration processing determines what the user has input in the new user registration window 91 by operating the remote control 18 in Step S51, as shown in FIG. 15, and in the event that the OK button 94 is selected, the user authentication completion flag within the RAM 9 is set to 1 as new user registration completion in Step S52, and the processing is ended. In the event that the cancel button 95 is selected, the user authentication completion flag within the RAM 9 is set to 0 as user authentication canceling, and the processing is ended. In the event that a user name is input or a password is input, selection of the OK button 94 or the cancel button 95 is awaited.

Figure 16:
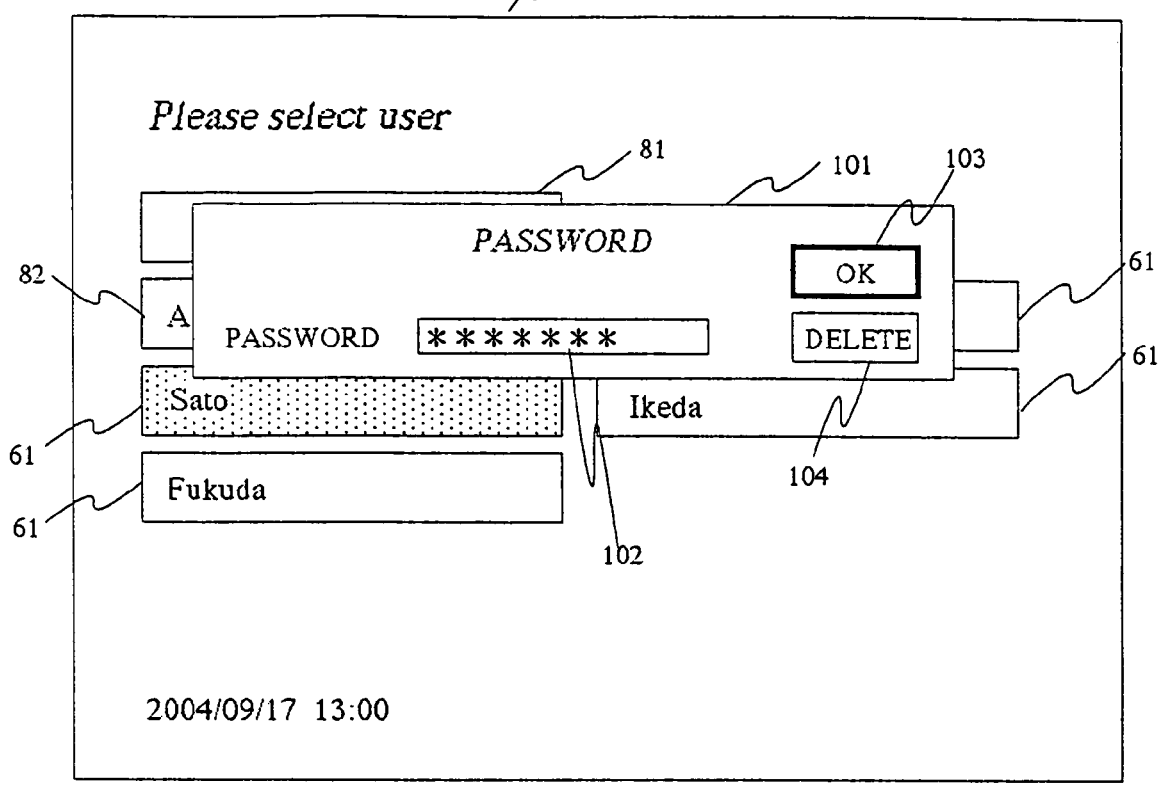

Also, with the transition to the user selection processing in Step S44, as illustrated in FIG. 16, a user selection window 101 is opened on the user selection image 80. The user selection window 101 has a password input area 102 for inputting a password, an OK button 103 for instructing input completion of a password for login, and a delete button 104 for instructing input completion of a password for deleting a registered user.

Figure 17:
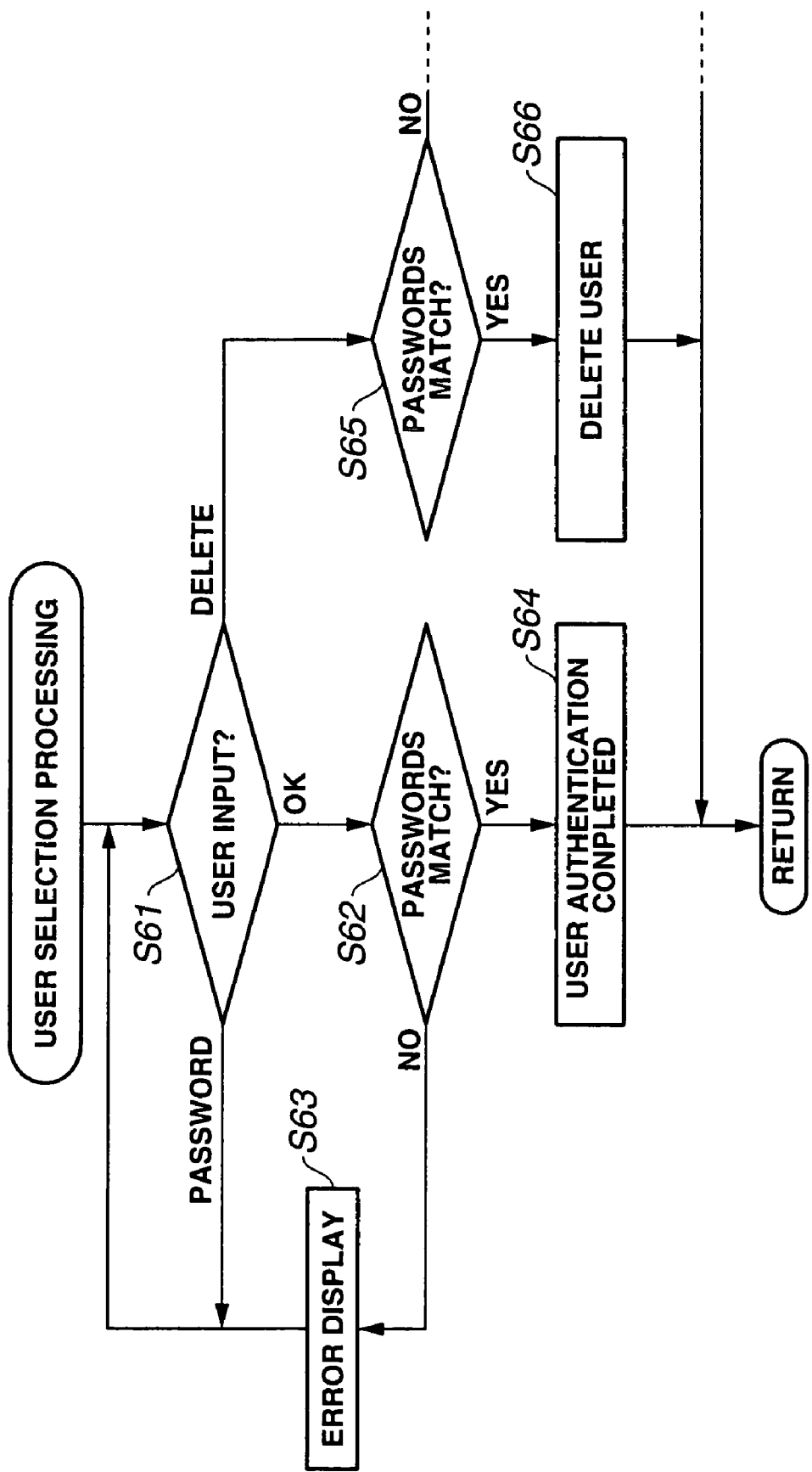

With the user selection processing, from this user selection window 101, as illustrated in FIG. 17, the user can determine what has been input in the user selection window 101 by operating the remote control 18 in Step S61, and in the event that the OK button 103 has been selected the flow proceeds to Step S62, in the event that the delete button 104 has been selected the flow proceeds to Step S65, and in the event that a password is input, selection of the OK button 103 or the delete button 103 is awaited.

In Step S62, determination is made as to whether the password input in the password input area 102 and the password for the user name registered (stored) in the SRAM 10 match. In the event that they do not match, an error display is performed such as "password does not match" for example in Step S63, and the flow returns to Step S61, and in the event that the passwords match, the user authentication completion flag within the RAM 9 is set to 1 as user authentication completion in Step S64, and the processing is ended.

In Step S65, determination is made as to whether the password input in the password input area 102 and the password for the user name registered (stored) in the SRAM 10 match. In the event they do not match, the processing is ended, and in the event the passwords match, the user to be registered is deleted in Step S66, and the processing is ended.

Next, one modification of the function which is restricted to arbitrary users with the system operation in the second qualifier operation mode and which is released to authenticated registered users with the system operation in the first qualifier operation mode will be described.

In the event of recording an image onto a memory card 19, with the system operation with an arbitrary user logged in with ANY (second qualifier operating mode), the date and time information and the image form information only are recorded on the image header, simply by recording the image onto the memory card 19. On the other hand, with the system operation with an authenticated registered user (first qualifier operating mode), the user name, as well as the date and time information and the image form information, is recorded on the image header, and further, the user name image showing the user name is superimposed on the image.

Figure 18:
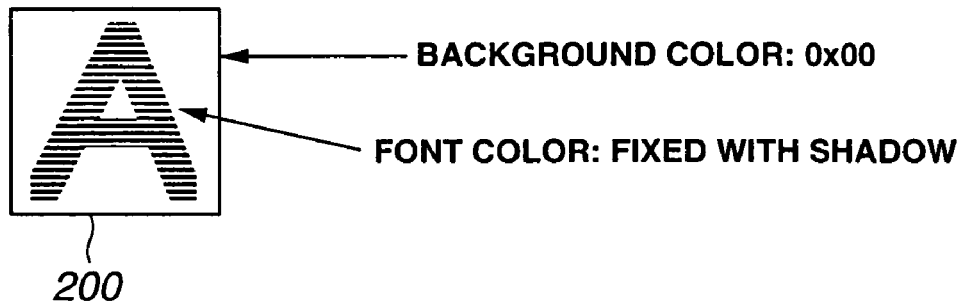
Figure 19:
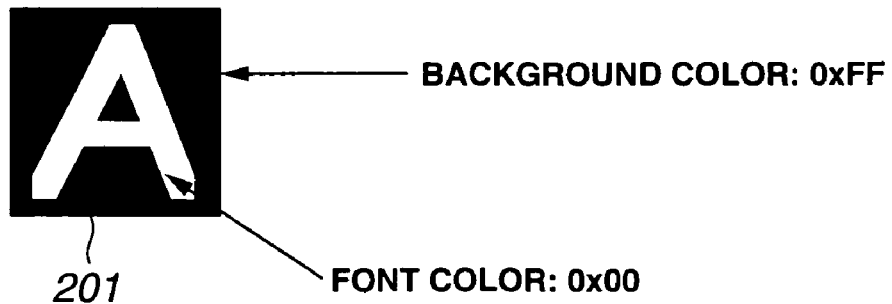
Figure 20:
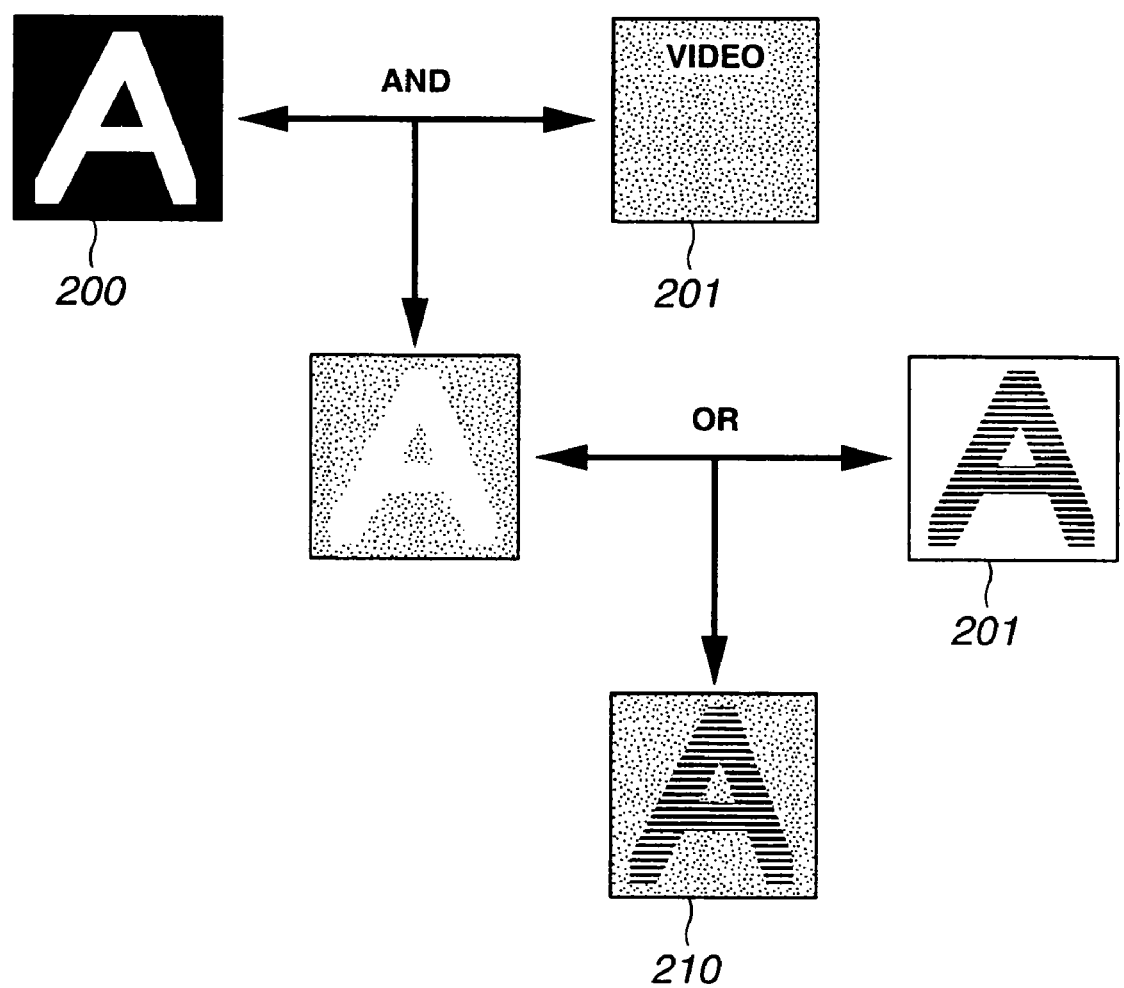
Figure 21:
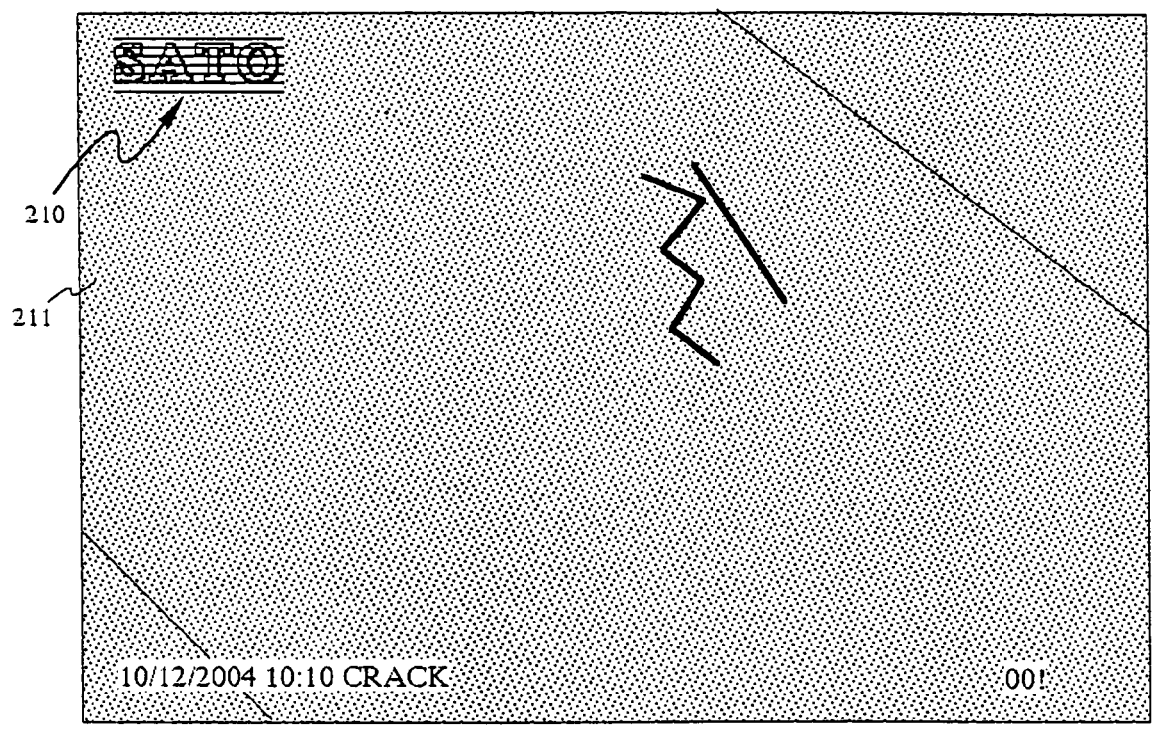

Here, this user name image will be described. With the system operation with an authenticated registered user (first qualifier operating mode), the CPU 7 generates font data on the RAM 9, formed of a superimposing font 200 such as that illustrated in FIG. 18 and a superimposing font template 201 such as that illustrated in FIG. 19. Then, as illustrated in FIG. 20, by setting the superimposing font template 201 as AND to the coordinates to be superimposed on the video, and further by setting the superimposing font 200 as OR to the coordinate position of AND, the user name image 210 is superimposed on the endoscope image 211, as shown in FIG. 21.

Thus, by superimposing the user name image 210 on the endoscope image 211 and recording this onto the memory card 19, whether the image has been recorded by an authenticated user or the image has been recorded by a user not authenticated can be easily distinguished simply by playing back the endoscope image 211 and confirming the user name image 210.

As described above, with the present embodiment, the control unit 4 uses the user setting function flag to (1) execute first qualifier authentication processing wherein only specified registered users can log in and operate the system with the first qualifier operating mode, and also to (2) execute second qualifier authentication processing wherein registered users or arbitrary users can log in and operate the system with the first qualifier operating mode (registered user login) or the second qualifier operating mode (arbitrary user login), and therefore login qualifiers can be set according to the examination environment.

In other words, in the case of an examination environment requiring a technician who has received appropriate education or a holder of appropriate certification to perform these examinations, execution of the first qualifier authentication processing, wherein only specified registered users can log in to the control unit 4, can be set.

Also, in the case of an examination environment not requiring strict managing of technicians, execution of the second qualifier authentication processing, wherein arbitrary users can log in to the control unit 4, can be set.

In the description of the embodiments, the explanation has been made such that the signal processing unit is provided in the endoscope device. However, the present invention is not limited thereto. For example, a software may be used as the one attached to the endoscope device.

With the present invention, it is clear that various embodiments over a wide range can be configured based on the present invention without departing from the spirit or scope of the invention. The present invention is not limited by any specific embodiments, except as restricted by the attached claims.

What is claimed is:

1. An endoscope device comprising:
    an endoscope for capturing the image of an object;
    a signal processing unit for signal processing of a image-capturing signal from the endoscope and for measurement of the object based on an endoscope image;
    the signal processing unit having
        an authentication information input unit for inputting authentication information,
        a login information storage unit for storing authentication confirmation information for verifying the authentication information and login mode information that specifies a login qualifier at the time of system login with multiple modes,
        an authentication verification unit for verifying the authentication information and the authentication confirmation information, and
        a login qualifier authorization unit for authorizing system login for a login qualifier based on verification results of the authentication verification unit when the login mode information is a first login mode information, and for at least an arbitrary login qualifier when the login mode information is a second login mode information, wherein the login mode information is determined by a user setting function.

2. An endoscope device according to claim 1, wherein the login qualifier authorization unit can update the authentication confirmation information when the login mode information is the second login mode information.

3. An endoscope device according to claim 1,
    wherein the authentication confirmation information includes at least a user's name, and
    wherein the endoscope device further comprises:
        an image recording unit for recording the endoscope image; and
        an authentication confirmation information superimposing unit which superimposes the user's name of the authentication confirmation information onto the endoscope image which is recorded by the image recording unit when the login mode information is the first login mode information.

4. An endoscope device according to claim 1,
wherein the signal processing unit comprises a connecting unit which can connect with a multi-purpose computer including at least a personal computer, and
wherein the authentication confirmation information can be updated by the multi-purpose computer when the login mode information is the first login mode information.

5. An endoscope device according to claim 1, wherein the authentication verification unit selects the login qualifier from a login qualifier menu screen based on the authentication confirmation information, and verifies the authentication information and the authentication confirmation information.

6. An endoscope device according to claim 1, wherein the login qualifier authorization unit generates a login qualifiers adding screen when the login mode information is the second login mode information, and can add the login qualifier by the login qualifiers adding screen.

7. An endoscope device according to claim 2, wherein the login qualifier authorization unit generates a login qualifiers adding screen when the login mode information is the second login mode information, and can add the login qualifier by the login qualifiers adding screen.

8. An endoscope device according to claim 1, wherein a login qualifier editing screen is generated when the login mode information is the second login mode information, the login qualifier authorization unit authorizes the editing of the login qualifier by the login qualifier editing screen, and the login mode information authorizes the editing of the authentication confirmation information.

\* \* \* \* \*